United States Patent Office 3,639,418
Patented Feb. 1, 1972

3,639,418
BISHYDANTOINS
Rudolf Merten, Leverkusen, Germany, assignor to Farbenfabriken Bayer Aktiengesellschaft, Leverkusen, Germany
No Drawing. Filed Feb. 19, 1968, Ser. No. 706,621
Claims priority, application Germany, Mar. 1, 1967, F 51,675
Int. Cl. C07d *19/32*
U.S. Cl. 260—309.5     4 Claims

ABSTRACT OF THE DISCLOSURE

Carboxylic acid esters containing hydantion or thiohydantoin groups which can be prepared by reacting an ethylene-1,2-carboxylic acid diester with a primary polyamine to yield an amino succinic acid group containing intermediate, further reacting the intermediate with a monoiso(thio)cyanate and cyclising the resulting reacted intermediate immediately or subsequently.

---

The present invention relates to a process for the production of polycarboxylic acid esters containing at least two hydantoin or thiohydantoin rings in the molecule. These new carboxylic acid esters correspond to the general formula

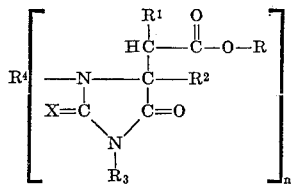

wherein R, $R^1$ and $R^2$, which may be the same or different, each represents hydrogen or an optionally substituted alkyl or cycloalkyl radical, $R^3$ represents an optionally substituted alkyl, aryl, aralkyl or heterocyclic radical, $R^4$ represents an optionally substituted alkyl, aryl aralkyl or heterocyclic radical, having a valency of $n$, X represents oxygen or sulphur and $n$ represents an integer from 2 to 4.

In particular the radicals R, $R^1$ and $R^2$ represent hydrogen, $C_1$–$C_{18}$ alkyl or $C_5$–$C_7$ cycloalkyl, $R^3$ represents $C_1$–$C_{18}$ alkyl, or a phenyl, naphthyl, biphenyl, diphenyl ether, benzyl or heterocyclic radical, $R^4$ represents a group having the same skeleton as the radical $R^3$, but having a valency from 2 to 4, depending upon the value of $n$.

In the most preferred embodiment of this invention, the radicals in the above described general formula have the following meaning. R is hydrogen, methyl or ethyl, $R^1$ and $R^2$ are each hydrogen or methyl, $R^3$ is $C_1$–$C_{18}$ alkyl, $C_5$–$C_7$ cycloalkyl, $C_1$–$C_{18}$ halogen(chloro)alkyl, phenyl; alkyl, halogen, nitro and alkoxy substituted phenyl and naphthyl, $R^4$ is $C_2$–$C_{36}$ alkylene, $C_5$–$C_7$ cycloalkylene, phenylene, alkyl substituted phenylene, diphenyl alkane, diphenyl ether and diphenyl sulfide, X is oxygen and $n$ is 2.

The heterocyclic radicals are preferably 5- or 6-membered rings containing one or more oxygen, nitrogen and/or sulphur atoms, for example radicals, derived from furan, pyridine, thiophene, imidazole, pyrimidine or piperazine.

The alkyl, aryl or heterocyclic radicals referred to above may also be substituted, for example, by halogen such as Cl or Br, by nitro groups, dialkylamino groups, alkoxy groups, aryloxy groups, alkyl radicals or carboalkoxy or carbamoyl groups.

The new carboxylic acid esters according to the invention may be obtained by initially reacting a diester of an ethylene-1,2-dicarboxylic acid with a primary polyamine, reacting the resulting aminosuccinic acid derivative with a monoisocyanate or monoisothiocyanate to form a urea or thiourea, and converting the resulting product either subsequently or simultaneously into a polycarboxylic acid ester containing hydantoin rings or thiohydantoin rings by ring closure in another reaction. This method of preparation may be represented by the following equation in which the general radicals are as defined above:

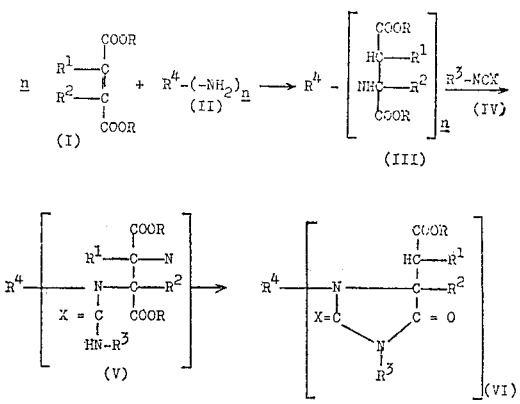

Esters of maleic acid such as dimethyl, diethyl or dibutyl maleate and the corresponding fumaric acid esters, are preferably used as esters of ethylene-1,2-dicarboxylic acids (Formula I). They may either be used in previously-prepared form, or may be prepared in situ from the corresponding alcohol (in excess) and maleic anhydride, especially since any excess alcohol that may be present does not affect the subsequent addition of the primary amines and isocyanates or isothiocyanates. It is, of course, also possible to use other esters of maleic acid with polyhydric alcohols, such as glycol, glycerol or trimethylol propane, which are by no means difficult to prepare from the corresponding polyhydric alcohol and maleic anhydride in a preceding operation. Instead of the maleic acid esters, it is also possible to use corresponding representatives of substituted maleic acids, in particular alkyl-substituted maleic acids such as methyl, dimethyl-, ethyl-, or butylmaleic acid. In each instance, it is also possible to use the corresponding fumaric acid esters.

Optionally substituted aliphatic, araliphatic, aromatic or even heterocyclic amines containing from 2 to 4 primary amino groups may be used as the primary polyamines (Formula II). Examples include alkylene diamines such as ethylene diamine, 1,2- and 1,3-propylene-diamine, 1,2-, 1,3- or 1,4-butylene diamine, hexamethylene diamine, decamethylene diamine, aliphatic and cycloaliphatic diamines obtained by condensing acetone with hydrocyanic acid, followed by hydrogenation, m- and p-phenylene diamines and their alkyl derivatives, for example tolylene and dimethyl benzene diamines, and araliphatic diamines such as 1,3- and 1,4-xylylene diamine or $\alpha$,3-diaminoethyl benzene. The polyvalent amines may also have skeletons derived from diphenylmethane, diphenylethane, diphenyl ether, diphenyl sulphone, benzene sulphonic acid phenyl ester, ethylene glycol dibenzoate, naphthalene or anthracene. Suitable triamines include for example 4,4′,4″-triaminotriphenyl phosphate and thiophosphate, 4,4′4″-triaminotriphenylmethane and 2,4,4′-triaminodiphenyl. The cycloaliphatic polyamines, derived from the above-mentioned aromatic compounds, such as cyclohexane-1,3- or 1,4-diamines may also be used.

Addition of the amines is generally carried out at relatively low temperatures, for example in a range from 0 to 100° C., in order to prevent aminolysis of the ester group still present in the molecule. If desired, a basic or acidic catalyst such as potassium carbonate, triethylamine, endoethylene piperazine or glacial acetic acid may be used. With less soluble components, the reaction will generally be carried out in an organic solvent, for example an alcohol such as methanol or ethanol. In this reaction, the quantitative proportions should be such that stoichiometric quantites of α,β-unsaturated double bonds, i.e. ethylene - 1,2 - dicarboxylic acid ester, and primary amino groups are preferably used. In general, the molar ratio should be from 1:2 to 2:1. The crude aminosuccinic acid esters thus obtained may be used as such without further purification. It is of course also possible to use independently-prepared aminosuccinic acid esters for the subsequent reaction with the di- or poly-isocyanate or isothiocyanate.

Compounds containing one isocyanate group in the molecule may be used as the monoisocyanates or isothiocyanates (Formula IV) in the subsequent reaction with the resulting, generally crude aminosuccinic acid esters. These isocyanate groups may be linked either aliphatically or aromatically. Examples of isocyanate components of this kind include alkyl and alkenyl isocyanates with from 1 to 18 carbon atoms; aralkyl isocyanates, such as benzyl or phenylethyl isocyanates; cycloalkyl isocyanates; aromatic isocyanates such as phenyl, tolyl, xylyl, chlorophenyl, di-, tri-, tetra- or pentachlorophenyl isocyanates, nitrophenyl or alkoxyphenyl isocyanate, isocyanatobenzoic acid esters, isocyanato phthalic acid esters, naphthyl isocyanate and furyl isocyanate.

Instead of the above-mentioned isocyanates, the corresponding isothiocyanates may also be used.

The reaction involving the polyfunctional aminosuccinic acid esters and the isocyanates or isothiocyanates is generally carried out in inert solvents, for example aliphatic or aromatic hydrocarbons and their halogenation products, esters, or ketones. Due to its high velocity, the reaction may also be carried out in the presence of alcoholic or phenolic hydroxy groups, i.e. groups of this kind may be present in the reaction components. Alternatively, excess alcohols may be used as solvents if a deficiency of the isocyanate or isothiocyanate component, based on the amino component, is used. As a rule, the reaction is carried out by adding the isocyanate component, optionally in an inert solvent, dropwise to the aminosuccinic acid ester previously introduced in a solvent, at a rate determined by the progress of the exothermic reaction. The quantitative ratios will generally be such that stoichiometric quantities of the NH- and NCX-groups are used. The temperature used for the reaction can be varied within wide limits, for example, in a range from 20 to 100° C. This addition reaction results in the formation of primary urea or thiourea groups, which are converted through ring-closure into corresponding hydantoin or thiohydantoin groups, in some instances immediately after they have been formed. Cyclisation may be promoted by subsequent heating, optionally in the presence of other or additional high-boiling solvents. In addition, cyclisation may be accelerated by the addition of basic or acidic catalysts in the broadest sense. Components of suitable melting point may even be directly cyclised in substance in the melt to form the polycarboxylic acid esters containing hydantoin or thiohydantoin rings. In this way, the required dicarboxylic and polycarboxylic acid esters containing hydantoin or thiohydantoin rings are obtained in almost pure form. Analysis of the reaction products by infra-red spectroscopy shows that possible or expected imide groups are obtained during the reaction.

If desired, the resulting esters of dicarboxylic or polycarboxylic acid esters may be converted in the usual way into other derivatives of the acid, for example into the free acids by hydrolysis, into amides by reaction with primary or secondary amines, and may even be transesterified with other monohydric or polyhydric alcohols.

The new polycarboxylic acid derivatives thus obtained may be used in particular for the production of plastics, particularly those with an outstanding resistance to high temperatures coupled with a high level of elasticity. The acids are stable without decomposing at temperatures of up to and above 300° C., and can be reacted in the usual way to form linear or branched plastics. If desired, conversion into polymeric products may be carried out immediately after the acids have been prepared.

As a rule, the polymers are formed by reacting the ester groups of the compounds according to the invention with polyhydric alcohols or polyfunctional amines to form polyesters or polyamides. Accordingly, the polymers contain additional ester or amide groups apart from the thiohydantoin rings. They may also be converted by methods known per se into polymers containing in addition heterocyclic rings such imidazole, benzimidazole, benzimide or pyromellitic acid imide rings.

The process according to the invention is illustrated by the succeeding examples.

EXAMPLE 1

288 parts by weight of dimethyl maleate are diluted with 100 parts by weight of methanol. 116 parts by weight of molten hexamethylene diamine are then added dropwise through a superheated steam funnel at a temperature of from 30 to 40° C. The methanol added is removed in vacuo at 20° C. and the product is diluted with 500 parts by weight of xylene. 236 parts by weight of phenyl isocyanate are then added dropwise over a period of 3 hours at 20° C., the product is left standing overnight and then heated the following day to an internal temperature of 135–140° C. The adduct is then concentrated at 180° C./12 torr, 575 parts by weight of crude 1,6-bis-[3-phenyl-5-carbomethoxymethylhydantoinyl)-(1)-]-hexane being obtained.

EXAMPLE 2

Addition of the hexamethylene diamine and subsequent reaction with the phenylisocyanate in the presence of (a) 200 parts by weight of methanol and (b) 200 parts by weight of benzene as solvents, is carried out in the manner described in Example 1. According to (a), 95 parts by weight of a bis-hydantoin diester containing a small quantity of carbamic acid ester are obtained, and according to (b) 580 parts by weight of a pure product corresponding to that of Example 1 are obtained.

EXAMPLE 3

In a procedure similar to that described in Example 1, 404 parts by weight of N,N'-bis-(1,2-bis-carbomethoxyethyl)-hexane are used instead of the crude aminosuccinic acid ester used in that example prepared in situ in a preceding operation. 580 parts by weight of the ester described in Example 1 are obtained.

EXAMPLE 4

198 parts by weight of 4,4'-diaminodiphenylmethane in solution in methanol are used as the diamine component and 250 parts by weight of cyclohexylisocyanate are used as the monoisocyanate component under similar conditions to those described in Example 1. Working up in the same way gives 680 parts by weight of crude, almost analytically pure, N,N'-bis-[3-cyclohexyl-5-carbomethoxymethylhydantoinyl-(1)-]-diphenylmethane which can be saponified to form the corresponding free dicarboxylic acid by hydrolysis with equivalent quantities of 15% by weight KOH in boiling ethanol.

EXAMPLE 5

108 parts by weight of m-phenylene diamine in solution in methanol are used as the diamine component and 122 parts by weight of methyl isocyanate are used as the isocyanate in a procedure similar to that described in Example 1. 450 parts by weight of crude 1,3-bis-[3-methylcyclohexyl - 5 - carbomethoxymethylhydantoinyl-(1)]-benzene are obtained.

EXAMPLE 6

116 parts by weight of fused hexamethylene diamine are added dropwise to 288 parts by weight of dimethyl maleate at 30° C. On the following day, 268 parts by weight of trimethylol propane are added. The product is heated at 50° C., followed by the dropwise addition over a period of 3 hours of 238 parts by weight of phenyl isocyanate. Cyclisation and transesterification are brought about by heating for 6 hours at 170° C., ultimately under a vacuum of 100 torr. The corresponding polyol containing hydantoin groups is obtained in a yield of 790 parts by weight, 9.8% OH, acid number=1.5. The polyol thus obtained, together with a polyisocyanate, may be processed at room temperature by conventional methods to form coatings, or in admixture with other polyhydroxyl compounds to form polyurethane foams. With masked polyisocyanates, it can be stoved to form an electrical insulating lacquer.

EXAMPLE 7

116 parts by weight of hexamethylene diamine are initially reacted at 30° C. with 288 parts by weight of dimethyl maleate. After an interval of 3 hours at 40° C., 400 parts by weight of xylene are added. 238 parts by weight of phenyl isocyanate are then added dropwise. On the following day, the product is heated under reflux for 6 hours and then concentrated at 120° C./12 torr. Following the addition of 268 parts by weight of trimethylol propane, the product is transesterified at 170° C./12 torr, leaving 733 parts by weight of a light yellow polyhydantoin polyol with 8.6% OH and an acid number of 1.2 which can be further processed to form polyurethane plastics as described in Example 6.

I claim:
1. A carboxylic acid ester of the formula

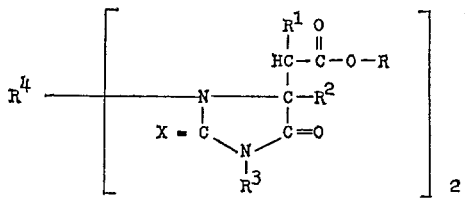

wherein R, $R^1$ and $R^2$ are each individually hydrogen, alkyl having from 1 to 18 carbon atoms or cycloalkyl containing from 5 to 7 carbon atoms; $R^3$ is alkyl and haloalkyl having from 1 to 18 carbon atoms, cycloalkyl having from 5 to 7 carbon atoms, phenyl, halophenyl, nitrophenyl or naphthyl; $R^4$ is alkylene having from 2 to 36 carbon atoms, cycloalkylene having from 5 to 7 carbon atoms, phenylene and bis(phenylene)alkane and X is oxygen or sulphur.

2. The carboxylic acid ester of claim 1 wherein R is hydrogen, methyl or ethyl, $R^1$ and $R^2$ are individually each hydrogen or methyl, $R^3$ is methyl, cyclohexyl or phenyl, $R^4$ is hexamethylene, bis(phenylene)methane or 1,3-phenylene and X is oxygen.

3. 1,6-bis-(3-phenyl-5-carbomethoxymethylhydantoinyl(1))hexane.

4. 1,3-bis-(3-methylcyclohexyl-5-carbomethoxymethylhydantoinyl(1))-benzene.

References Cited

UNITED STATES PATENTS

| | | | |
|---|---|---|---|
| 3,296,208 | 1/1967 | Rogers | 260—67.5 |
| 3,448,170 | 6/1969 | Merten et al. | 260—858 |

FOREIGN PATENTS

| | | | |
|---|---|---|---|
| 1,273,868 | 9/1961 | France | 260—309.5 |

OTHER REFERENCES

Zilkha et al., J. Org. Chem. 24, 1096–8 (1959).

HENRY R. JILES, Primary Examiner

G. T. TODD, Assistant Examiner

U.S. Cl. X.R.

260—858